3,453,246
THERMOSETTABLE COMPOSITION COMPOSED OF A POLYANHYDRIDE AND A MONO-OXIRANE COMPOUND AND METHOD OF PRODUCING
William J. Heilman, Allison Park, Pa., assignor to Gulf Research & Development Company, Pittsburgh, Pa., a corporation of Delaware
No Drawing. Filed Mar. 14, 1966, Ser. No. 533,868
Int. Cl. C08f 43/02
U.S. Cl. 260—78.5                               31 Claims

ABSTRACT OF THE DISCLOSURE

A liquid composition in provided which is capable of being thermoset to an infusible resin. The composition contains a solid polyanhydride, such as a copolymer of an olefin and maleic anhydride, and a liquid olefinically unsaturated monooxirane compound which is capable of polymerization by free-radical means, for example, glycidyl methacrylate. Optionally, the composition may contain a soluble unconjugated tertiary amine. The liquid solution cures through reaction of the anhydride-epoxide groups and interaction of the olefinic double bonds of the monooxirane compound.

---

This invention relates to new liquid compositions capable of being cured to solid infusible resins having high hardness and, in particular, to new liquid compositions capable of being cured to solid infusible resins having high hardness and high heat distortion temperatures, and to methods for making the same.

There are many types of resinous compositions in the art. For many applications, such as coating, laminating, adhesives, encapsulation, potting and filament winding, it is desirable that the resinous material be hard, resistant to attack by chemicals, and most preferably have, in addition, high thermal stability. The reaction of a solid non-aromatic polyanhydride, such as one prepared by the copolymerization of maleic anhydride and an alpha-olefin with a saturated liquid monoepoxide will form a cross-linked resin under the influence of heat, but the time required under normal curing temperatures is quite extended, and, for certain purposes, the resulting resins are of insufficient hardness. It has now been found that certain unsaturated liquide monoepoxides react quite quickly under the influence of heat with certain solid polyanhydrides to form solid infusible resins with unexpectedly high hardness properties.

In accordance with the invention, a new composition capable of being cured thermally in relatively short times to a solid infusible resin having excellent hardness properties comprises a liquid solution at room temperature of a mixture of:

A solid compound containing at least two succinic anhydride groups and less than three conjugated double bonds when one of the conjugated double bonds is between the carbon atoms alpha to the carbonyl groups in a succinic anhydride group; and A liquid olefinically unsaturated monooxirane compound containing as its only functional groups a single oxirane oxygen atom and an olefinic double bond capable of being polymerized by free-radical means.

In one embodiment of the invention, a new resin compound having excellent hardness properties comprises the cured reaction product of a mixture of:

A solid polyanhydride containing at least two succinic anhydride groups and less than three conjugated double bonds when one of the conjugated double bonds is between the carbon atoms alpha to the carbonyl groups in a succinic anhydride group; and A liquid olefinically unsaturated monooxirane compound containing as its only functional groups, a single oxirane oxygen atom and an olefinic double bond capable of being polymerized by free-radical means;

said polyanhydride being substantially completely dissolved in said liquid monooxirane compound to form a liquid solution at about room temperature before curing is substantially complete.

One of the components of the compositions of this invention is a solid compound containing at least two succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least two anhydride groups where the carbon atoms alpha to the carbonyl groups in the anhydride are connected to each other through a bond selected from the group consisting of a single bond and a double bond and wherein said solid compound contains less than three conjugated double bonds when one of the conjugated double bonds is between the carbon atoms alpha to said carbonyl groups. By the term "conjugated double bonds" in this application is meant only conjugated carbon to carbon double bonds.

It is preferred that in the solid compound component containing at least two succinic anhydride groups, that the carbon atoms alpha to the carbonyl groups in the succinic anhydride be connected to each other through a single bond. At least two succinic anhydride groups are required to obtain proper crosslinking of the solid compound with the liquid monomeric organic oxirane compound to be defined below. In addition, the solid polyanhydride compounds are defined so as to exclude aromatic polyanhydrides where the carbon atoms alpha to the carbonyl groups in the anhydride group are a part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner. One suitable procedure is to polymerize an unsaturated derivative of succinic anhydride with itself or with another olefinic compound. By an unsaturated derivative of succinic anhydride is meant any organic compound comprising a succinic anhydride group and at least one carbon to carbon double bond. By a succinic anhydride group is meant the group represented by Formula I below:

Formula I

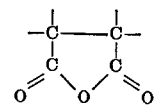

The carbon to carbon double bond can occur in the Formula I above between the carbon atoms alpha to the carbonyl groups in the succinic anhydride group or the carbon to carbon double bond can occur in the groups attached to the carbon atoms alpha to the carbonyl groups in the succinic anhydride group. For example, the solid polyanhydrides can be prepared by the homopolymerization of succinic anhydride derivatives represented by the general Formulas II through VII below.

Formula II

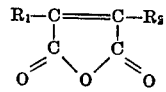

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this specification is meant any group of atoms consisting of carbon and hydrogen, such as alkyl, cycloalkyl, aryl, alkaryl, and aralkyl. Unless, otherwise indicated, the term "alkyl" is meant to include only saturated groups. The term "hydrocarbon radical" is therefore intended to substantially exclude olefinic unsaturation in the radicals unless otherwise indicated. By the term "substituted hydrocarbon radical" in the specification is meant where one or more atoms in the hydrocarbon radical have been exchanged for a halogen; $-C\equiv N$; $-OR$ group where R is any hydrocarbon radical as defined above; or

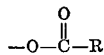

where R is any hydrocarbon radical as defined above. Examples of suitable anhydrides having the above formula are as follows:

maleic anhydride;
chloromaleic anhydride;
methylmaleic anhydride;
ethylmaleic anhydride;
hexylmaleic anhydride;
pentadecylmaleic anhydride;
octacosylmaleic anhydride;
4-propyl-8-methyl-eicosylmaleic anhydride;
cyclohexylmaleic anhydride;
phenylmaleic anhydride;
diphenylmaleic anhydride;
naphthylmaleic anhydride;
4-propyl-1-naphthylmaleic anhydride;
4-cyclohexyltridecylmaleic anhydride;
orthotolylmaleic anhydride;
paraethylphenylmaleic anhydride;
benzylmaleic anhydride;
dibromomaleic anhydride;
bromochloromaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
cyanoethylmaleic anhydride;
4-cyanononylmaleic anhydride; and
1-bromo-2-(3-cyanohexyl)maleic anhydride.

Formula III

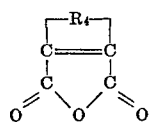

where $R_4$ is selected from the group consisting of a divalent hydrocarbon radical having between 2 and 5 cyclic carbon atoms and a substituted divalent hydrocarbon radical having between 2 and 5 cyclic carbon atoms. The total number of carbon atoms in $R_4$ can be between 3 and 36 and is preferably between 4 and 16. Examples of suitable compounds having the above Formula III are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexene anhydride;
1,2-dicarboxylic-4-pentyl-5-octylcyclohexene anhydride; and
1,2-dicarboxylic-4(2-chloropentyl)-cyclohexene anhydride.

Formula IV

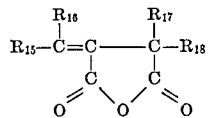

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable compounds having the above Formula IV are as follows:

itaconic anhydride;
1,2-dicarboxylic-pentene-2 anhydride;
1,2-dicarboxylic-octene-2 anhydride;
1,2-dicarboxylic-tetradecene-2,anhydride;
1,2-dicarboxylic-eicosene-2 anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

Formula V

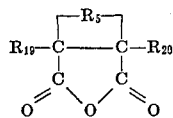

where $R_{19}$ and $R_{20}$ can be the same or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_5$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds having the above Formula V include: bicyclo(2.2.1)5-heptene-2,3-dicarboxylic anhydride; cis-4-cyclohexene-1,2-dicarboxylic anhydride; 7-oxabicyclo(2.2.1)5-heptene-2,3-dicarboxylic anhydride; 4-methyl-4-cyclohexene-1,2-dicarboxylic anhydride; bicyclo(2.2.2)1-octene-4,5-dicarboxylic anhydride; and 2-styryl-5-phenyl-1-cyclohexene-3,4-dicarboxylic anhydride.

Formula VI

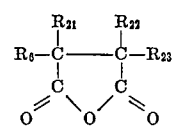

where $R_{21}$, $R_{22}$ and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds having the above formula are as follows:

propenylsuccinic anhydride;
butenylsuccinic anhydride;
hexenylsuccinic anhydride;
dodecenylsuccinic anhydride;
eicosenylsuccinic anhydride;
isopropenylsuccinic anhydride;
octenylsuccinic anhydride;
octadecenylsuccinic anhydride;
1-dodecenyl-2-chlorosuccinic anhydride;
1,2-dichlorododecenylsuccinic anhydride;
1,1-dipropyl-2-methyl-2-propenylsuccinic anhydride; and
1-octyl-1-bromo-2-butyl-2-dodecenylsuccinic anhydride.

Formula VII

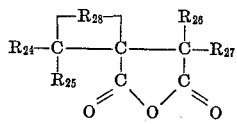

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the Formula VII above can be between 9 and 40 and is preferably between 9 and 16. These compounds can suitably be prepared by the Diels-Alder reaction between a conjugated diene and itaconic and substituted itaconic anhydrides.

In the compounds represented by Formulas II, IV, V, VI and VII above, where R, $R_1$, $R_2$, $R_6$ and $R_{15}$ through $R_{27}$ are selected from the group consisting of hydrocarbon and substituted hydrocarbon radicals, they can have between 1 and 30 and preferably between 1 and 15 carbon atoms. The total number of carbon atoms per molecule for any particular compound represented by Formulas II through VII above can be between 4 and 40 and preferably between 4 and 20.

In addition to the homopolymerization of the unsaturated succinic anhydride compounds defined above, the solid polyanhydrides can be prepared by the copolymerization of an unsaturated succinic anhydride compound such as defined above with (1) each other, i.e. copolymerization of mixtures of unsaturated succinic anhydride compounds, or (2) with any other organic monoolefin compound. For example, the unsaturated succinic anhydride compounds can be copolymerized with olefinic compounds as represented by the general Formula VIII below:

Formula VIII

where $R_3$ is selected from the group consisting of hydrogen, halogen, a hydrocarbon radical and a substituted hydrocarbon radical; and $x_1$ and $x_2$ are selected from the group consisting of hydrogen, halogen, a hydrocarbon radical, a substituted hydrocarbon radical and —OR where R is any hydrocarbon radical as defined above. The olefinic compound suitably has between 2 and 40 carbon atoms per molecule, preferably between 2 and 30, and more preferably between 6 and 20 carbon atoms per molecule.

The preferred olefinic compounds for use in forming the solid polyanhydride component of the compositions of this invention are those where $R_3$ in the above general formula is hydrogen and the sum of the carbon atoms in $x_1$ and $x_2$ is less than 28. The most preferred olefinic compounds are the aliphatic alpha monoolefins and, in particular, the straight-chain alpha monoolefins having between 2 and 30 carbon atoms per molecule.

The preferred copolymers are those prepared by the copolymerization of maleic anhydride with an alpha-olefinic hydrocarbon having between 2 and 30 carbon atoms per molecule, preferably between 4 and 20 carbon atoms per molecule.

It is understood that the term "olefin" is meant to include mixtures of monoolefins having between 2 and 40 carbon atoms per molecule, such as those obtained by the thermal or catalytic cracking of petroleum stocks. It is desirable that only one olefinic bond per molecule be present in the anhydride or the olefin since more than one double bond per molecule promotes gel formation and internal crosslinking. Minor amounts of diolefins, on the order of two percent or less, can, however, be tolerated in the anhydride and olefin.

Examples of olefin compounds or mixtures of olefins suitable to form the solid polyanhydride components of the compositions of this invention include:

ethylene
propylene
1-butene
2-butene
1-pentene
2-pentene
2-methyl-1-butene
1-hexene
3-hexene
4-methyl-1-pentene
1-heptene
3-ethyl-2-pentene
3,3-dimethyl-1-pentene
1-octene
2-methyl-1-heptene
3,3-dimethyl-1-hexene
1-nonene
4-nonene
4,4-dimethyl-1-heptene
1-decene
2-decene
1-undecene
2-methyl-4-propyl-3-heptene
1-dodecene
1-tridecene
1-tetradecene
tetraisobutylene
1-octadecene
1-eicosene
2-methyl-1-nonadecene
1-docosene
1-heptacosene
1-hentriacontene
2-heptadecyl-2-eicosene
styrene
methyl acrylate
ethyl acrylate
vinylchloride
methylvinyl ether
vinyl acetate
methylvinyl acetate
vinyl naphthalene
allyl chloride
acrolein
acrylic acid
p-bromostyrene
p-chlorostyrene
cyclohexyl acrylate
2,5-dichlorostyrene 2-ethylhexyl acrylate
p-isopropylstyrene
allylisothiocyanate
allyl laurate
allylstearate
2-ethoxyethyl acrylate
4-ethoxystyrene
4-methoxystyrene
p-nitrostyrene
octadecyl acrylate
phenyl acrylate
isopropyl acrylate
sodium acrylate
2,2,3,3-tetrafluoropropyl acrylate
vinylacetic acid
vinyl benzoate
vinyl-2-butoxyethyl ether
vinyl n-butyl ether
vinyl butyrate
vinyl chloroacetate
vinyl-2-chloroethyl ether
vinyl n-decanoate
vinyl ethyl ether
vinyl formate
methyl vinyl ketone
ethyl vinyl ketone
alphamethylstyrene
2-methylpentene-1
2-methylbutene-1
benzyl methacrylate
methyl methacrylate
n-butyl methacrylate
alpha-chlorostyrene
alpha-chloroacrylonitrile
2-chloroethyl methacrylate
2-cyanoacrylamide
n-decyl methacrylate
vinylidene cyanide
diethyl itaconate
vinylidene chlorobromide
isopropenyl propionate
isopropenyl butyrate
2-ethoxyethyl methacrylate
ethyl-alpha-bromoacrylate
isopropenyl acetate
methacrolein
methacroyl acetone
methacrylic acid
octadecyl methacrylate
2-phenylethyl methacrylate
isopropyl methacrylate
sodium methacrylate
2,2,3,3-tetrafluoropropyl methacrylate
tetrahydrofurfuryl methacrylate
vinylidene chloride
crotonic acid
beta-chlorostyrene
crotyl bromide
diethyl maleate
dilauryl maleate
ethyl crotonate
fumaronitrile
methyl crotonate
cinnamoyl chloride
crotyl alcohol
diamyl maleate
di-n-butyl fumarate
diethyl fumarate
di-2-ethylhexyl fumarate
di-iso-octyl fumarate
di-iso-octyl maleate
dimethyl maleate
dibutyl maleate
citraconic acid and
beta,beta-dimethylacrylic acid.

One preferred form of the solid polyanhydride can be represented by the general formula:

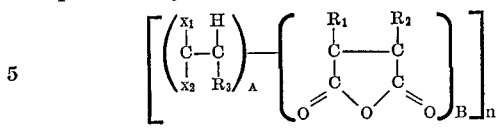

where $R_1$, $R_2$, $R_3$, $x_1$ and $x_2$ are as defined above; $n$ is an integer having a value from about 2 to about 100, or higher and preferably from 2 to about 30; A is an integer having a value from 0 to 100; and B is an integer selected from the group consisting of 1 and 2.

In the copolymerization of the unsaturated succinic anhydride compounds with the olefin compounds as defined, at least two unsaturated succinic anhydride compounds must, of course, be incorporated therein in order to produce a solid polyanhydride having at least two succinic anhydride groups therein.

The polymerization or copolymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride can vary over a wide range, but is generally between about 1:1 and 5:1, with preferred ranges between 1:1 and 3:1. The particularly preferred molar ratio of olefin to anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used in which case much lower temperatures, i.e. −80° C., can be employed. The upper reaction temperature is determined by the boiling point of the components of the reaction mixture and the predominance of unwanted side reactions.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reacting components. Suitable solvents include, for example:

n-pentane
n-hexane
n-octane
methylene chloride
tetrahydrofuran
di-ispropyl ether
carbon tetrachloride
cyclohexane
methylcyclohexane
n-propylacetate
toluene
benzene
ethylbenzene
cumene
xylene
ethyl-n-butyrate tetrachloroethylene
di-n-butylether
n-amylacetate
anisol
cyclohexanone
bromobenzene
methylorthotolylether
acetone
methylethylketone; and
ethylbenzylether The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobisisobutyronitrile.

The molecular weight of the polyanhydride component of the compositions of this invention can vary over a wide range. The dilute solution viscosity (which is a measure of molecular weight) of five grams of the polyanhydride per deciliter of acetone at 77° F. can suitably be between about 0.01 and 2 or more, and is preferably between about 0.03 and 0.95 deciliter per gram.

The compositions of this invention also comprise a liquid olefinically unsaturated monooxirane compound containing as its only functional groups a single oxirane oxygen atom and at least one olefinic double bond capable of being polymerized by free-radical means. By a functional group is meant a group such as an oxirane oxygen atom which would participate in the anhydride-monoepoxide crosslinking reaction, i.e. combine chemically with the anhydride, such as for example, —OH, —SH and —NH groups. By an oxirane oxygen atom is meant an oxygen atom directly connected to two carbon atoms which carbon atoms are connected to each other, i.e.

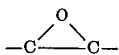

A monooxirane compound is frequently termed a monoepoxide. The liquid monooxirane compound must also contain at least one, and preferably only one, olefinic double bond capable of being polymerized by free-radical means. By free-radical means is meant thermal means, i.e. heat; ultra-violet light; radiation and well known free-radical chemical initiators, such as organic peroxides, azo compounds, etc., as mentioned above. Suitable ethylenically unsaturated monooxirane compounds are those which contain, in addition to the single oxirane oxygen, at least one terminal

grouping.

The monooxirane compounds used in the compositions of this invention are the alpha-olefinically unsaturated monooxirane compounds which contain substituents directly connected to the beta-carbon atom of the alpha olefin, which substituents result in a net electron withdrawal from the alpha olefin double bond. In other words, the alpha double bond is activated for polymerization by substituents or groups which effect an electron withdrawal from the olefinic double bond. Electron withdrawing groups are well known in the art and include, for example, halogen;

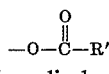

where R' is an organic radical;

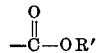

where R' is any organic radical; —C≡N; an aromatic organic radical;

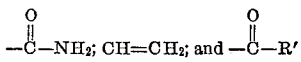

where R' is any organic radical. Substituents or groups which donate electrons are undesirable but can be used if the net effect of the two substituents on the beta-carbon atom of the alpha olefin is to effect an electron withdrawal and result in a monomer which is capable of polymerization by free-radical means. Substituents which donate electrons are also well known in the art and include, for example, —OR', where R' is any organic radical; —CR$_{30}$R$_{31}$R$_{32}$, where R$_{30}$, R$_{31}$ and R$_{32}$ are selected from the group consisting of hydrogen and any organic radical. For example,

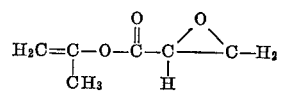

contains an electron donating group (—CH$_3$) and an electron withdrawing group

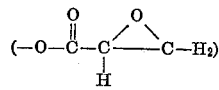

of about equal power on the beta-carbon atom. This compound is therefore unsuitable because the net effect is that there is no electron withdrawal from the double bond. In a similar manner, allyl glycidyl ether, i.e.,

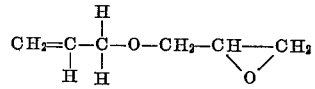

is not a suitable monooxirane compound for the compositions of this invention since the

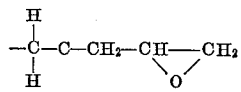

group donates electrons to the double bond. On the other hand, compounds having the general formula

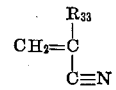

where R$_{33}$ is an alkyl group containing a single oxirane oxygen atom, readily polymerize even though R$_{33}$ is an electron donating group because —C≡N is such a strong electron withdrawal group that the net effect, i.e. the summation of the electron donating power of the R$_{33}$ group and the electron withdrawal power of the —C≡N group is that electrons tend to be withdrawn from the olefinic double bond, thus activating it for polymerization. As a further example, a compound such as

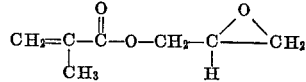

will readily polymerize even though the beta-carbon atom contains the electron donating methyl group, since again the electron withdrawal power of the

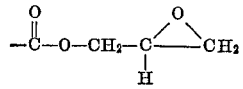

group is greater than the electron donating power of the —CH$_3$ group.

The preferred monooxirane compounds are the alpha-olefinically unsaturated terminal monoepoxides represented by the general formula:

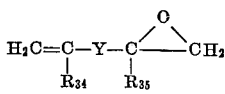

where R$_{35}$ is selected from the group consisting of hydrogen and a saturated hydrocarbon radical having between 1 and 10 carbon atoms; where $R_{34}$ is selected from the group consisting of hydrogen; halogen; —C≡N;

—COOR", where R" is any saturated hydrocarbon radical having between 1 and 10 carbon atoms; and

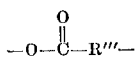

where R''' is as defined when Y is selected from the group consisting of

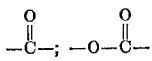

and

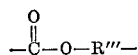

where R''' is any divalent hydrocarbon radical having between 1 and 20 carbon atoms; and where $R_{34}$ is selected from the group consisting of a saturated hydrocarbon radical having between 1 and 10 carbon atoms; hydrogen; halogen; —C≡N;

—COOR", where R" is as defined; and

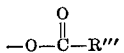

where R''' is as defined when Y is

where R''' is any divalent hydrocarbon radical having between 1 and 20 carbon atoms.

Other preferred monooxirane compounds are the alpha-olefinically unsaturated terminal monoepoxides represented by the general formula:

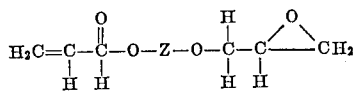

where Z is any hydrocarbon radical having between one and 20 carbon atoms.

The total number of carbon atoms in a monooxirane compound should be such that the compound is liquid at about room temperature. In general, the number of carbon atoms is suitably between 4 and 30, and preferably between 4 and 10 carbon atoms per molecule. Examples of suitable compounds include, but are not limited to, glycidyl methacrylate;
glycidyl acrylate;
glycidyl propacrylate;
3,4-epoxy butene-1;
3,4-epoxy-3-chloro butene-1;
3-keto-4,5-epoxy pentene-1;
2-methyl-3-keto-4,5-epoxy pentene-1;
2-cyano-3-keto-4,5-epoxy pentene-1;
3-keto-4-methyl-4,5-epoxy pentene-1;

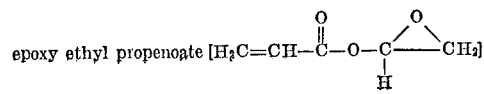

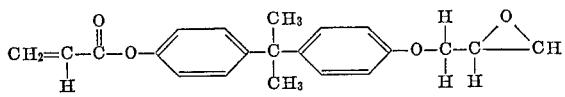

2-methyl-2,3-epoxy propyl acrylate;
2-decyl-2,3-epoxy propyl acrylate;
4-methyl-4,5-epoxy pentyl acrylate;
4-methyl-4,5-epoxy pentyl methylacrylate;
2-methyl-2,3-epoxy propyl methylacrylate;

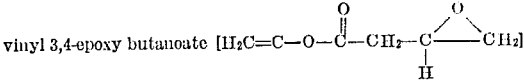

vinyl 3-methyl-3,4-epoxy butanoate; and
vinyl 7,8-epoxy octanoate.

The ratio of the polyanhydride to monoepoxide compound to employ in the compositions of this invention can vary over a wide range. The specific ratio to employ with any given polyanhydride or monoepoxide is determined, first of all, by whether a liquid solution of the polyanhydride in the monoepoxide is obtained at room temperature. The liquid solution hardens at least in part due to a crosslinking reaction occasioned by the interaction of the anhydride and epoxide groups to form ester linkages. Ether linkages also form due to the interaction of several epoxide groups. Since the polyanhydride has many reactive anhydride groups per molecule while the monooxirane compound has only one reactive epoxy group per molecule, the ratio of the anhydride to epoxy compound (more simply the A/E ratio) is usually spoken of and given as an equivalent ratio. Theoretically, one equivalent of the polyanhydride compound can react with one equivalent of the monooxirane compound. One equivalent of the monooxirane compound is, of course, one mole since there is only one oxirane oxygen per molecule. The anhydride equivalent of the polyanhydride is defined as the average number of anhydride groups per molecule. The anhydride equivalency of the polyanhydrides used in the compositions of this invention is at least two, i.e. the polyanhydride has at least two anhydride groups per molecule. The anhydride to epoxide equivalent ratio, i.e. the A/E ratio, can suitably be between about 0.1:1 and 5:1, but is preferably between 0.3:1 and 2:1, more preferably between 0.5:1 and 0.75:1, for the best physical and chemical properties.

It has been found that the above described liquid solutions of a polyanhydride in a liquid olefinically unsaturated monoepoxide are capable of being cured thermally in relatively short periods of time to a solid infusible resin having excellent hardness properties, whereas, liquid solutions of the same polyanhydrides in liquid saturated monoepoxides take much longer thermally to result in finished resins which do not possess the desired hardness characteristics of the new compositions of this invention.

The curing of the liquid solutions described above is believed to proceed, not only by the anhydride-epoxide crosslinking reaction, but by an internal polymerization reaction. The crosslinking reaction proceeds, as noted, by the interaction of an anhydride function of the polyanhydride with the epoxide function of the unsaturated monooxirane compound while the internal polymerization proceeds through the interaction of the olefinic double bonds.

The curing temperature has been found to be critical in order to obtain finally cured resins which have a hardness in excess of 80 on the Barcol 935 hardness scale. The use of curing temperatures less than 80° C. results in finally cured resins which are solid, but have inferior hardness properties. Curing temperatures are therefore suitably between 80° C. and 250° C., preferably between 90° C. and 200° C. for times between 0.1 and 50 hours, preferably between 2 and 20 hours, the higher temperatures requiring the shorter curing times. The time required to reach the desired curing temperature is not considered part of the curing time. Curing can also occur in stages, if desired, that is, a first stage curing at a relatively low temperature of between 50° C. and 100° C. for between 1 and 30 hours to obtain a hard resin which is then post-cured in a second stage at a temperature between 90° C. and 200° C. for between 2 and 30 hours to obtain a finished very hard resin. The one stage curing is preferred since it requires less time to result in a finished product.

The invention will be further described with reference to the following experimental work.

In the examples to follow, the polyanhydride compound was prepared by the copolymerization of maleic anhydride and hexene-1. This copolymer was prepared by reacting hexene-1 and maleic anhydride in a molar ratio of about 2:1 in the liquid phase in the presence of a mutual solvent at a temperature between 60° and 100° C., using as a catalyst between 2 and 3 weight percent of benzoyl peroxide based on the maleic anhydride. The copolymer was then separated from the solvent and any residual catalyst, and then dried. Infrared analysis and nuclear magnetic resonance showed the hexene-1 and maleic anhydride to have combined in a 1:1 molar ratio. The dilute solution viscosities of the copolymer measured as noted above were between 0.04 and 1.15.

In all of the examples, the hardness was measured by the Barcol 935 instrument while the heat distortion temperature was determined by ASTM test D–648–56.

Example 1

In the run for this example, a sufficient amount of hexene-1-maleic anhydride copolymer described above was dissolved in distilled glycidyl methacrylate so that the anhydried to epoxide ratio was 0.5. The solution was cured by heating it twenty-four hours at room temperature, followed by heating for twenty-four hours at 150° C. The resulting resin had a Barcol 935 hardness of 92 and a heat distortion temperature (HDT) of 91° C.

Example 2

Example 1 was repeated except the curing was for twenty-four hours at 50° C. followed by twenty-four hours at 150° C. The resulting resin had a hardness of 88 and a heat distortion temperature of 80° C.

Example 3

Example 1 was repeated except the curing occurred in one stage for twenty-four hours at 120° C. The resulting resin had a hardness of 89 and a heat distortion temperature of 76° C.

Comparison of Examples 1 through 3 shows that the resulting resins, whether cured in one or two stages, are quite hard and have approximately the same heat distortion temperatures.

Example 4

Example 1 was repeated except the curing occurred in only one stage for twenty-four hours at room temperature. The resulting resin had a hardness of only 37.

Example 5

The resin from Example 4 was further heated for twenty-four hours at 50° C. and the resulting resin had a hardness of only 69.

Comparison of Examples 1 through 3 with Examples 4 and 5 shows that curing temperatures of 50° C. and lower for time periods of twenty-four hours are insufficient to result in finished resins having the desired hardness properties, i.e. a hardness of over 80 as determined by the Barcol 935 test.

Example 6

Example 4 was repeated except the cured conditions were twenty-four hours at 80° C. The resulting resin had a hardness of 82.

A comparison of Examples 1 through 5 with Example 6 shows the criticality of the curing temperature for the compositions of this invention. It is necessary to employ the curing temperature of at least about 80° C. to obtain finished resins having a Barcol 935 hardness in excess of 80.

Example 7

In the run for this example a sufficient amount of the hexene-1-maleic anhydride copolymers described above was dissolved in epichlorohydrin (a saturated liquid monoepoxide) so that the anhydride to epoxide ratio was 0.5. The solution was cured at 50° C. for thirty days and then at 100° C. for thirty additional days. It took at least ten days before the liquid solidified and even after the prolonged curing above, the resulting resin had a Barcol 935 hardness of only 55.

While the above resinous compositions have excellent hardness properties, it is highly desirable in some applications, as noted above, for the resins to have, in addition, excellent thermal stability properties. A resin has excellent thermal stability properties if it has a high heat distortion temperature as measured by ASTM test D–648–56. Conventional epoxy resins made from diepoxides and which are cured with amine catalysts have heat distortion temperatures on the order of 80° to 100° C. It is usually necessary to utilize aromatic type anhydrides and dianhydrides as curing agents for the epoxy resins in order to obtain finished resins having heat distortion temperatures in excess of 150° C. It has now been found that the above described new liquid compositions of this invention can be converted to hard infusible resins having high heat distortion temperatures without the use of aromatic anhydride curing agents.

In accordance with this aspect of the invention, a new composition capable of being cured to a solid infusible resin having excellent hardness and thermal stability properties comprises a liquid solution at room temperature of a mixture of:

A solid compound containing at least two succinic anhydride groups and less than three conjugated double bonds when one of the conjugated double bonds is between the carbon atoms alpha to the carbonyl groups in a succinic anhydride group;

A soluble unconjugated tertiary amine and a liquid olefinically unsaturated monooxirane compound containing as its only functional groups, a single oxirane oxygen atom and an olefinic double bond capable of being polymerized by a free-radical means.

In one embodiment of this invention, a new resin composition having excellent thermal stability properties comprises the reaction product of a mixture of:

A solid polyanhydride containing at least two succinic anhydride groups and less than three conjugated double bonds when one of the conjugated double bonds is between the carbon atoms alpha to the carbonyl groups in a succinic anhydride group;

A soluble unconjugated tertiary amine; and a liquid olefinically unsaturated monooxirane compound containing as its only functional groups, a single oxirane oxygen atom and an olefinic double bond capable of being polymerized by a free-radical means;

said polyanhydride and said tertiary amine being substantially completely dissolved in said liquid monooxirane compound to form a liquid solution at about room temperature before curing is substantially complete.

In another embodiment of this invention, a new method of preparing a solid infusible resin having a high heat distortion temperature which comprises:

Forming a liquid solution of a solid compound containing at least two succinic anhydride groups and less than three conjugated double bonds when one of the conjugated double bonds is between the carbon atoms alpha to the carbonyl groups in a succinic anhydride group, and a liquid olefinically unsaturated monooxirane compound containing as its only functional groups a single oxirane oxygen atom and an olefinic double bond capable of being polymerized by free-radical means, crosslinking said solid compound and solid monooxirane compound substantially only by reacting the oxirane oxygen atom with the anhydride groups; and thereafter polymerizing said monooxirane compound through the double bond at a temperature of at least 80° C.

In yet another embodiment of this invention, a method of preparing a solid infusible resin having a high heat distortion temperature which comprises:

Forming a liquid solution of a solid compound containing at least two succinic anhydride groups and less than three conjugated double bonds when one of the conjugated double bonds is between the carbon atoms alpha to the carbonyl groups in a succinic anhydride group; a soluble unconjugated tertiary amine; and a liquid olefinically unsaturated monooxirane compound containing as its only functional groups a single oxirane oxygen atom and an olefinic double bond capable of being polymerized by free-radical means;

Substantially completely crosslinking the polyanhydride and monooxirane compounds through the anhydride and epoxide groups; and Thereafter further crosslinking the monooxirane compound through the olefinic double bond at a temperature of at least 80° C.

While it is not certain, it is believed that the presence of the tertiary amine in the above described compositions has a dual function in that it acts to accelerate the epoxide-anhydride crosslinking reaction at a lower temperature while at the same time inhibiting the thermal polymerization of the unsaturated monooxirane compound. Thus, it is believed that finished resins having unexpectedly high heat distortion temperatures are the result of the sequential method of curing the liquid compositions of this invention. That is, in order to obtain finished resins, i.e. finally cured resins, having the unexpectedly high heat distortion temperatures in addition to high hardness, it is necessary to first substantially completely crosslink the polyanhydride and the olefinically unsaturated monooxirane compounds only through the interaction of the anhydride and epoxide groups and then to further crosslink the resins by the internal polymerization of the olefinically unsaturated monooxirane compounds through the olefinic double bonds which are capable of polymerization by free-radical means. While it has been found that the tertiary amines to be defined below are particularly effective in the compositions of this invention in order to utilize the above method, any suitable means can be used to substantially inhibit the olefinically unsaturated monooxirane compound from polymerization until the anhydride-epoxide crosslinking reaction is substantially complete. By a finally cured resin is meant after both the crosslinking through the oxirane oxygen and anhydride reaction and the internal polymerization reactions have occurred.

It has been found that the soluble tertiary amines, in order to be useful in the compositions of this invention must be unconjugated. That is, the tertiary amines can be any soluble organic compound containing at least one tertiary amine group which is free of conjugation with respect to other tertiary amine groups, said organic compound having all of its nitrogen atoms present only as part of the tertiary amine groups. By free of conjugation with respect to other tertiary amine groups is meant that the nitrogen atom of one tertiary amine group is not connected to a nitrogen atom of another tertiary amine group through alternate single and double bonded atoms. The preferred tertiary amines are the monoamines containing only C, H and N. By a soluble tertiary amine is meant substantially completely soluble in the solution of the particular polyanhydride-olefinically unsaturated monoepoxide system employed.

One suitable class of tertiary amines can be represented by the general formula:

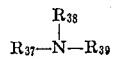

where $R_{37}$, $R_{38}$ and $R_{39}$ can be the same or different and can be selected from the group consisting of a hydrocarbon radical as defined above having between 1 and 37 carbon atoms, and a substituted hydrocarbon radical as defined having between 1 and 37 carbon atoms; and wherein the sum of the carbon atoms in $R_{37}$, $R_{38}$ and $R_{39}$ is less than 40; and wherein the term "alkyl" for $R_{37}$, $R_{38}$ and $R_{39}$ includes both saturated and unsaturated groups. Examples of suitable tertiary amines having the above formula include:

trimethylamine
triethylamine
N,N-dimethylaniline
tri-n-hexylamine
tri-n-heptylamine
triphenylamine
tri-n-decylamine
alpha-methylbenzyldimethylamine
N,N-diethylaniline
N-ethyl-N-phenylbenzylamine
N,N-dimethylbenzylamine
N,N-diethylallylamine
N,N-dimethylcyclohexylamine
N,N-diphenylmethylamine
N-methyl-N-phenylbenzylamine
N,N-dimethyl-p-nitrosoaniline
meta-diethylaminophenol
dimethylaminomethylphenol
N,N-diethyldodecylamine
tridimethylaminomethylphenol
dimethylaminoethyl methacrylate
N,N-di-n-propylaniline
N,N-diethyl-o-toluidine
N,N-diethyl-p-toluidine
N,N-dimethyl-1-naphthylamine
N,N-diethyl-1-naphthylamine
N-ethyl-N-methylaniline
p-bromo-N,N-dimethylaniline
p-bromo-N,N-diethylaniline
N,N-dimethyl-m-toluidine
N,N-diethyl-m-toluidine
N,N-diethyl-2,4-dimethylaniline
p-chloro-N,N-diethylaniline
N,N-diethyl-2,5-dimethylaniline
N-benzyl-N-ethyl-m-toluidine
N,N-alpha-trimethylbenzylamine
tri-n-propylamine
tri-n-butylamine
tri-isopentylamine
tri-pentylamine
N,N-dimethyloctadecylamine
N,N-dimethyl-2-ethylhexylamine;
trioctylamine; and
triodecylamine The preferred tertiary amines are the monoamines wherein the nitrogen atom of the amine group is one of the ring atoms in an aromatic ring. Particularly preferred are the single ring mono-tertiary amines wherein the nitrogen atom of the amine group is one of the ring atoms in an aromatic ring, i.e. the pyridine and substituted pyridines as represented by the formula:

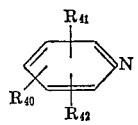

where $R_{40}$, $R_{41}$ and $R_{42}$ can be the same or different and are selected from the group consisting of hydrogen, a hydrocarbon radical as defined above having between 1 and 10 carbon atoms, and a substituted hydrocarbon radical as defined having between 1 and 10 carbon atoms; and wherein the term "alkyl" includes both saturated and unsaturated groups. Examples of suitable tertiary amines having the above formula include:

pyridine
2-allylpyridine
3-ethylpyridine
4-ethylpyridine
2-benzylpyridine
2-isopropylpyridine
4-phenylpyridine
3-bromopyridine
2-chloropyridine
vinylpyridine
2-picoline
3-picoline
4-picoline
3,5-dicyanopyridine
3,5-dimethylpyridine
2,4-dimethylpyridine
2,6-dimethylpyridine
2,4,6-trimethylpyridine It has been found that the use of conjugated tertiary amines, such as phenazine, results in a finally cured resin having thermal stability properties which are only slightly better than the properties of the finally cured resin cured solely by thermal means.

Examples of other suitable tertiary amines include:

N,N-diethyl-m-phenetidine
N,N,N',N'-tetramethylmethylene diamine
N,N,N',N'-tetramethyl-1,3-butane diamine
N,N,N',N'-tetraethylethylene diamine
triethylene diamine
quinoline
quinaldine
2,6-dimethylquinoline
2-chloroquinoline
isopyrrole
oxazole
isothiazole
1,2,3,4-trioxazole
1,2,4-oxazine
1,4-oxazine
indolenine
4-pyridine
indoxazine
benzoxazole
acridine In accordance with the invention, one preferred way to achieve the above sequential curing is to add to the liquid solution of the defined polyanhydride and defined olefinically unsaturated monoepoxide, a soluble unconjugated tertiary amine. The curing must now be done in two stages, the second stage being at a higher temperature than the curing temperature in the first stage. The time and temperature of each stage of cure will vary over a wide range depending, among other things, on the reactivity of the particular monoepoxide and polyanhydride employed, in addition to the amount and type of tertiary amine in the composition. However, the tertiary amine acts to catalyze the anhydride-epoxide crosslinking reaction at a temperature less than would be possible in the absence of the tertiary amine. The rate of the crosslinking reaction is a direct function of the temperature employed and the amount of tertiary amine used. In addition, the crosslinking reaction is an exothermic reaction and means must be employed to control the temperature to avoid it getting so high that simultaneous polymerization of the monoepoxide, or even charring of the resin occurs. The temperature during the first stage cure is therefore preferably kept low, usually below 80° C. The preferred temperatures of curing in the first stage for the compositions containing a soluble tertiary amine are between 10° C. and 60° C. with the most preferred temperatures being room temperature (about 25° C.). The time of curing is dependent on the other variables, but is suitably between 0.1 and 50 hours, or more, and is usually between 0.5 and 24 hours.

The compositions become hard and infusible during the first stage of curing and increasing the temperature during the second stage of curing does not give rise to an exothermic reaction. The temperature of curing in the second stage must be high enough to overcome the polymerization inhibiting effect of the soluble tertiary amine. In general, the curing temperature during the second stage should exceed 80° C. and preferably be between 100° C. and 180° C., and more preferably about 150° C. The upper temperature limit should not exceed the thermal stability point of the resin which varies but is usually less than about 300° C. The time of curing is again dependent on the other variables, especially temperature and the amount of amine in the composition, but is generally between 0.1 and 100 hours with the usual curing time being between 0.5 and 24 hours.

The polymerization in the second stage curing above was initiated by thermal means. The polymerization can also suitably be promoted by other free-radical means, such as by ultraviolet light radiation at lower temperatures, radiation by means of a Van de Graaff accelerator, radium or other means which give off atomic particles.

The amount of the soluble unconjugated tertiary amine to employ should be such that the polymerization of the olefincially unsaturated monoepoxide is substantially inhibited until the polyanhydride and monoepoxide are substantially completely crosslinked through the interaction of the anhydride and epoxide groups. This amount will vary depending on the activities of the polyanhydride, monoepoxide and tertiary amine and on the temperature of curing. In general, the higher the first stage curing temperature, the more amine is required for inhibition purposes, but this increased amount of amine promotes an exothermic anhydride-expoxide crosslinking reaction as noted above, and means must be provided to control the temperature of curing within the desired limits. In general, the amount of soluble tertiary amine to employ will be between 0.01 and 20 parts by weight of amine per 100 parts of the polyanhydride-monoepoxide solution. The preferred concentration of tertiary amine is usually between 2 and 5 parts by weight per 100 parts of polyanhydride-monoepoxide solution.

The method of addition of the tertiary amine accelerator is critical. They must be added to the mixture of polyanhydride and monoepoxde after the polyanhydried is dissolved in the monoepoxide, since it normally takes longer for the solution of the polyanhydride in the monoepoxide than for the amine accelerators to harden the mixture. Consequently, if the amine is added first to the monoepoxide and the polyanhydride added to this mixture, the composition may harden before all of the polyanhydride is dissolved, and a grainy composition with inferior chemical and physical properties will result.

The invention will be further described with reference to the following specific examples.

In all of the examples to follow the polyanhydride employed was the maleic anhydride-hexene-1 copolymer described and used in Examples 1-7 above and the olefinically unsaturated monoepoxide was glycidyl methacrylate. Sufficient polyanhydride was dissolved in the monoepoxide so that the A/E ratio was 0.5. The amine was added to the solution of the anhydride in the epoxide.

Example 8

In the run for this example, 3 phr. of 2,6-lutidine was added to the solution of the polyanhydride in the glycidyl methacrylate. The solution was cured in a first stage for twenty-four hours at room temperature and was cured for an additional twenty-four hours at 150° C. The Barcol 935 hardness of the finally cured resin was 96 and the heat distortion temperature was 269° C.

Example 9

Example 8 was repeated except the 2,6-lutidine was replaced with 3 phr. of acridine and the first stage cure time was increased to 72 hours. The finally cured resin had a yield of 92 and a heat distortion temperature of 169° C.

A comparison of Examples 1, 8 and 9 shows that the addition of a tertiary amine to the composition used in Example 1 increases the thermal stability properties of the finally cured resin.

Example 10

Example 9 was repeated except the concentration of acridine was reduced to 0.5 phr. and the first stage curing time was reduced to twenty-four hours. The finally cured resin had a hardness of 96 and a heat distortion temperature of 248° C.

A comparison of Examples 9 and 10 illustrates the effect of temperature and concentration on the heat distortion temperature of the finally cured resin. Apparently, a concentration of 3 phr. of acridine inhibits the internal polymerization of the glycidyl methacrylate even at a second stage curing temperature as high as 150° C. for Example 10 shows that, under substantially the same conditions, a finally cured resin having a much higher heat distortion temperature was obtained when the concentration of acridine was reduced to 0.5 phr.

EXAMPLE 11

Example 10 was repeated except the concentration of acridine was further reduced to 0.1 phr. and the second stage curing temperature was reduced to 50° C. The resulting resin had a hardness of 84 and a heat distortion temperature of 58° C.

A comparison of Examples 10 and 11 shows that a second stage curing temperature of 50° C. is insufficient to result in the production of finally cured resins having excellent thermal stability. Example 11 should also be compared with Example 5 above which employed no catalyst and curing conditions similar to those in Example 11. The finally cured resin in Example 5 had a hardness of 69, whereas, the finally cured resin in Example 11 had a hardness of 84. Note, therefore, that temperatures as low as 50° C. can be used to obtain resins having a Barcol 935 hardness in excess of 80 if a soluble tertiary amine as defined is added to the compositions.

Example 12

Example 11 was repeated except the 0.1 percent acridine was replaced with 3 phr. of 3-picoline. The resulting finally cured resin had a hardness of 88 and a heat distortion temperature of 61° C.

Example 13

Example 12 was repeated except the second stage curing temperature was increased to 75° C. The finally cured resin had a hardness of 91 and a heat distortion temperature of 92° C.

Example 14

Example 13 was repeated except the second stage curing temperature was increased to 100° C. The finally cured resin had a hardness of 93 and a heat distortion temperature of 113° C.

Example 15

Example 14 was repeated except the second stage curing temperature was increased to 150° C. The finally cured resin had a hardness of 96 and a heat distortion temperature of 249° C.

A comparison of Examples 12 through 15 shows the effect of the second stage curing temperature to overcome the inhibition effect of the concentration of the tertiary amine. These examples clearly show that, as the second stage curing temperature is increased, the heat distortion temperature of the finally cured resin was increased to a maximum of 249° C. Example 12 shows, as does Example 11, that a very hard (over 80 hardness) resin is obtained even at 50° C. when an amine is present, but, to obtain a finally cured resin having both excellent hardness and thermal stability, the second stage temperature must be at least 80° C.

Example 16

Example 15 was repeated except the concentration of 3-picoline was reduced to 1.0 phr. The finally cured resin had a hardness of 95 and a heat distortion temperature of 264° C.

Example 17

Example 16 was repeated except the concentration of 3-picoline was reduced to 0.5 phr. The finally cured resin had a hardness of 97 and a heat distortion temperature of 260° C.

Example 18

Example 17 was repeated except the concentration of 3-picoline was further reduced to 0.1 phr. The finally cured resin had a hardness of 95 and a heat distortion temperature of 226° C.

Example 19

Example 18 was repeated except the concentration of 3-picoline was further reduced to 0.006 phr. The finally cured resin had a heat distortion temperature of 122° C.

Example 20

Example 19 was repeated except the concentration of 3-picoline was 0.002 phr. The finally cured resin had a heat distortion temperature of 108° C.

A comparison of Examples 15 through 20 shows the effect of 3-picoline concentration on the heat distortion temperature of the finally cured resin. The optimum 3-picoline concentration for a second stage curing temperature of 150° C. is between about 0.5 and 1.5 phr. Higher concentrations (Example 15) result in slightly lower heat distortion temperatures, while lower concentrations (Examples 18–20) result in lower heat distortion temperatures. Example 1 shows that the heat distortion temperature of the same composition, cured in the same manner but without 3-picoline added, was 91° C. Thus, the addition of very small amounts, i.e. 0.002 phr., of a tertiary amine results in an increase in the heat distortion temperature of the finally cured resin.

Example 21

Example 9 was repeated except the acridine was replaced with phenazine, a conjugated di-tertiary amine. The finally cured resin had a hardness of 91 and a heat distortion temperature of 96° C.

A comparison of Examples 1, 9 and 21 shows that the addition of a conjugated diamine results in no additional improvement in the finally cured resin than if an amine compound were not used at all.

Example 22

In the run for this example, allyl glycidyl ether

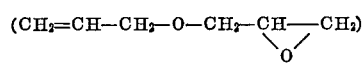

replaced the glycidyl methacrylate in the base composition. To the solution of the maleic anhydride-hexene-1 copolymer in the allyl glycidyl ether was added 3 phr. of 3-picoline and 1 phr. of VAZO (alpha,alpha'-azodiisobutyronitrile). The composition was cured in three stages, the first stage at room temperature for twenty-four hours, the second stage at 50° C. for twenty-four hours, and the third stage at 100° C. for twenty-four hours. The finally cured resin had a hardness of zero and a heat distortion temperature of 41° C.

Example 23

Example 22 was repeated except the VAZO was omitted and the curing occurred in two stages, the first stage at room temperature for twenty-four hours and the second stage at 150° C. for twenty-four hours. The finally cured resin had a hardness of 15 and a heat distortion temperature of 23° C.

A comparison of Examples 22 and 23 shows that some unsaturated monoepoxides are unsuitable for producing finally cured resins having the high thermal stability of the compositions of this invention. Example 22 shows that even upon the addition of a free radical catalyst, such as VAZO, the heat stability properties of the finally cured resin is not improved to any great extent. This shows that the double bond in allyl glycidyl ether is not such that it can be polymerized by a free-radical means.

Example 24

In the run for this example, a sufficient amount of maleic anhydride-hexene-1 copolymer described above was added to glycidyl acetate

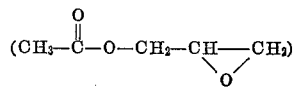

to form a liquid solution having an $A/E$ ratio of 0.5. To the solution was added 5 phr. of 3-picoline. This composition was cured at room temperature for twenty-four hours, and the finally cured resin had a hardness of 44.

Example 25

Example 24 was repeated except the concentration of 3-picoline was reduced to 3 phr. and the curing occurred in two stages, the first stage for twenty-four hours at room temperature and the second stage for twenty-four hours at 50° C. The finally cured resin had a hardness of 52 and a heat distortion temperature of 47° C.

A comparison of Examples 24 and 25 with Example 1 and Examples 15 through 20 shows that a saturated monoepoxide does not result in a finally cured resin having the high hardness nor the high thermal stability properties of the compositions of this invention.

As noted above, the compositions of the subject invention are useful in many applications, such as adhesives, encapsulation, etc. In yet another aspect of the subject invention, it has been found that the compositions of the subject invention make glass laminates having unexpectedly superior flexural strengths, chemical solvent resistance and weathering characteristics.

In accordance with this aspect of the invention, an article of manufacture has been found which possesses superior flexural strength, chemical and solvent resistance properties and weathering characteristics which comprises layers of a porous inert material impregnated and held together by the reaction product of a mixture comprising:

A solid compound containing at least two succinic anhydride groups and less than three conjugated double bonds when one of the conjugated double bonds is between the carbon atoms alpha to the carbonyl groups in a succinic anhydride group; and A liquid olefinically unsaturated monooxirane compound containing as its only functional groups a single oxirane oxygen atom and an olefinic double bond capable of being polymerized by free-radical means;

said solid compound being substantially completely dissolved in said liquid monooxirane compound to form a liquid solution at room temperature before said impregnation.

Laminating is the practice of laying together of a multiplicity of sheets of material and consolidating the sheets with some form of binder, such as an adhesive or synthetic resin into a unit structure. The core or base sheet material is usually fibrous in nature. The most common fibrous material for use in laminates is cellulose which in its most popular forms is paper, cotton and linen sheets. Any porous fibrous sheet material can suitably be used as the core or base material of the laminates, whether it be natural, as cotton, or synthetic as nylon. Wood veneer is also a suitable core material as is woven glass and other fabrics, asbestos paper, sisal, hemp, etc. Woven-glass fabric is the preferred core material for the laminates of this invention.

Woven glass fabrics are well known and readily available commercially. The fabrics come in different weaves, in various thicknesses and using various yarn sizes. The yarn is composed of "single yarns" twisted or plied together. The "single yarn" is composed of a multiplicity of glass filaments which are drawn through orifices in the bottom of a tank holding the liquid glass. The individual glass filaments are very abrasive and friable. As a result, a lubricant or finish, usually a starch-like material, must be applied to the filaments to permit them to eventually be woven. Various lubricants or finishes are applied by the manufacturers of woven-glass fabrics to enhance the usefulness of their products with particular types of adhesives. For example, some finishes are colored and would be undesirable for use where colorless products were wanted, or some finishes are chemically incompatible with the adhesive or resin to be applied. It is particularly desirable in preparing the laminates of this invention using a glass fabric core, that the glass fabric have a first coating or finish which chemically reacts under the conditions of curing with at least one of the components of the laminate binder composition. Particularly preferred are the silane finishes which are chemically bonded to the glass, but leave free reactive groups on the glass surface. These free reactive groups are preferably selected from the class consisting of vinyl groups ($CH_2$=CH—); —OH; —$NH_2$; >NH; and —SH.

The laminates can be prepared by any suitable procedure. The sheets of core material are impregnated or coated by any suitable means such as by brushing, or dipping, and the lay-ups can be made wet, that is, a multiplicity of the sheets are staked or layed one upon the other while the compositions of this invention are wet or sticky. The laminates are then consolidated by the application of heat and pressure, if desired. The application of heat and pressure in excess of 1,000 p.s.i.g., preferably 1,200 to 3,000 p.s.i.g., is the preferred curing procedure, since the use of high pressures provides a method for controlling the binder or resin content of the laminate by squeezing out excess resin, and for obtaining laminates having unexpectedly high flexural strengths.

It is one of the features of the laminates prepared using the resin composition of this invention as a binder that less total resin is required to achieve laminates having optimum physical properties. Usually, glass fabric core laminates prepared from commercial polyesters and diepoxy resins, such as Epon 828 (diglycidyl ether of bisphenol A having an epoxide equivalent of 175–200), require a relatively high resin content of about 30 to 50 percent to obtain finished products having optimum physical properties. The glass fabric core laminates formed using the composition of this invention require less resin, usually between 15 and 30 percent for optimum properties. More or less resin can, of course, be used, for example, the resin content can vary between 5 and 80 weight percent of the total laminate.

For ease of preparation of the laminates, the viscosity of the liquid resin impregnating solution is important. The viscosity of the liquid solutions of the compositions of this invention increases as the viscosity of the monoepoxide increases, as the molecular weight of the polyanhydride increases and as the $A/E$ ratio increases, solution of suitable viscosity for easy lamination being those wherein the $A/E$ ratio is between 0.25:1 and 1:1. When the $A/E$ ratio exceeds about 1:1, the viscosity of the solution is too high to be a workable liquid. The viscosity cannot suitably be reduced by the application of heat since this promotes premature hardening of the resin before it can be uniformly spread and the laminate properly formed. It has been found, however, that the viscosity of the solutions can suitably be reduced by the addition of inert non-reactive diluents such as acetone, methyl ethyl ketone, propylene chloride and cyclohexanone. Thus, it is possible to apply coatings to the core material in which the $A/E$ ratio exceeds 1:1.

It has additionally been found that a tack-free "prepreg" can be formed for use in a dry lay-up technique using the compositions of this invention which have been reduced in viscosity by the addition of a nonreactive inert solvent which has a volatility such that it can be removed from the surface of the coated core material at a temperature less than the curing temperature of the solvent free composition. That is, it has been found quite unexpectedly that a tack-free, dry to the touch, article of manufacture can be made which can thereafter be consolidated into a liminate by the application of heat and pressure to a stacked multiplicity of the dry prepregs.

The fact that the uncured resin compositions of this invention would form a tack-free prepreg was quite surprising since the preparation of tack-free prepregs usually involves a partial curing of the resin or binder to what is termed a B stage. No such partial curing of the diluted liquid resin compositions of this invention occurs. A simple evaporation of the solvent which occurs by any suitable means, such as by blowing an inert gas such as nitrogen over the coated core material results in a coating which is dry to the touch and which can subsequently be thermoset by the application of heat.

In accordance with the invention, a new article of manufacture has been developed which comprises a sheet of porous fibrous material having a tack-free coating thereon comprising an intimate admixture of a compound containing at least two succinic anhydride groups and less than three conjugated double bonds when one of the conjugated double bonds is between the carbon atoms alpha to the carbonyl groups in a succinic anhydride group; and an olefinically unsaturated monooxirane compound containing as its only functional groups a single oxirane oxygen atom and an olefinic double bond capable of being polymerized by free-radical means, where in said admixture, the anhydride to epoxide equivalent ratio is at least 1:1, preferably 1:1 to 3:1.

The curing of the coating on the above-described article of manufacture whether it be a single tack-free sheet or a multiplicity of tack-free or wet sheets in the form of a laminate occurs by heating the article for at least a portion of the time under an increased pressure at a temperature above 80° C. The preferred curing pressure is above 1,000 p.s.i.g., most preferably between 1,200 and 3,000 p.s.i.g. The temperature of curing can be between 80° C. and 250° C., preferably between 100° C. and 200° C. for times as short as one minute or less to 10 to 50 hours, or more. Usually the curing is in two stages, the first being under the increased pressures for between one minute or less to 10 minutes, followed by a slower cure at atmospheric pressure for times between one and 30 hours. If it is desired that the article of manufacture having high thermal stability, then the sequential curing defined above using the above-defined amine catalysts in the above-described amounts can be employed. The use of the amine catalysts is not preferred since the catalyst tends to promote premature thermosetting of the coated dry prepregs and, quite unexpectedly, results in finally cured laminates having inferior solvent resistance properties.

This aspect of the invention will be further described with reference to the following experimental work.

The liquid resin solution for use as a binder for the laminates was prepared by dissolving a sufficient amount of the maleic anhydride-hexene-1-copolymer described above in glycidyl methacrylate so that the anhydride to epoxide equavalent ratio was 0.5. The solution was applied by brush to 9 x 9 inch squares of glass fabric No. 181 having an A–1100 amino silane finish obtained from the United Merchants Industrial Fabrics Division of United Merchants and Manufacturers, Inc. Additional sheets of the glass fabric and resin were applied until twelve sheets of fabric core were stacked together with the resin coating in between. The fabric sheets were placed upon one another so that the longest strands of the woven fabric were oriented in the same direction.

The laminates were cured or consolidated by the application of heat and pressure in a first stage, followed by additional heating at a higher temperature in a second stage.

Example 26

In the laminate prepared for this example, no catalyst was used in the resin composition. The laminate was cured for twenty-four hours at 100° C. using a pressure of 19,000 p.s.i.g., followed by curing in a second stage for twenty-four hours at 150° C. at atmospheric pressure. The resulting laminate had a flexural strength as measured by ASTM Test D-790-49-T of 79,800. The resin content of the finished laminate was 22.4 percent by weight.

Example 27

In the laminate prepared for this example, 3 phr. of 3-picoline was added to the resin composition used in Example 26 before the resin was applied to the glass fabric. The laminate was cured for twenty-four hours at room temperature using 19,000 p.s.i.g., followed by a second stage cure for twenty-four hours at atmospheric pressure and 100° C. The flexural strength of the resulting laminate was 78,000 p.s.i.g. The resin content of the finished laminate was 24 percent by weight.

A comparison of the laminates of Examples 26 and 27 shows that their initial flexural strengths are about the same whether or not a catalyst is employed.

Example 28

In the laminate prepared for this example, a commercial polyester resin was employed which is sold under the tradename "Selectron." The laminate was cured 30 minutes at 170° F. under a pressure of 5,000 p.s.i.g., followed by curing at 60 minutes at atmospheric pressure and a temperature of 121° C. These curing conditions were employed as they were the recommended curing conditions by the Pittsburgh Plate Glass Company, who supplied the Selectron resin. The finally cured laminate had a flexural strength of 51,700 p.s.i.g. The resin content of the finished laminate was 32 percent by weight.

A comparison of Examples 26 through Example 28 shows the unexpectedly high flexural strength properties of the laminates prepared using the compositions of this invention. Commercial glass fabric laminates using phenol and melamine resin have flexural strengths on the order of 30,000 p.s.i.g.

The three laminates described in Examples 26 through 28 were tested for thermal and solvent resistance properties using as individual solvents—sulfuric acid having an $H_2SO_4$ content of 20 percent; 10 percent sodium hydroxide solution; water; and isooctane. The laminates were immersed in each of the solvents and solutions for a period of four days at a temperature of 71° C. and their flexural strength again determined. The thermal treatment consisted of heating the laminates at 260° C. for 30 minutes. The flexural strengths of each of the laminates after each of the above treatments are summarized in Table I below.

TABLE I

| Treatment | Flexural strength | | |
|---|---|---|---|
| | Ex. 26 | Ex. 27 | Ex. 28 |
| (1) Thermal, 500° F. for 30 minutes | 91,400 | 52,600 | 38,800 |
| (2) 20% H₂SO₄ | 56,400 | 16,300 | 12,700 |
| (3) 10% NaOH | 14,900 | 4,975 | 4,440 |
| (4) Water | 81,900 | 45,500 | 46,700 |
| (5) Isooctane | 87,000 | 76,700 | 50,000 |
| (6) Blank | 79,800 | 78,000 | 51,700 |

A comparison of the laminates of Examples 26 through 28 shows that the laminate prepared from a composition consisting essentially of the defined solid polyanhydride and the defined olefinically unsaturated monooxirane compound has unexpectedly superior resistance to the effect of solvents and, in particular, to the effect of sulfuric acid, sodium hydroxide and water. It is particularly surprising that the laminate of Example 26 should have such excellent water resistance since it is generally expected that laminates having lower percentages of resin are more prone to water absorption and de-lamination due to starvation of the laminated structure of sufficient resin.

Example 29

Example 26 was repeated except only seven plys of the glass fabric core were employed. The curing was for 30 minutes at 150° C. using a pressure of 19,000 p.s.i.g. in a first stage, followed by twenty-four hours at 150° C. The percent resin in the finished laminate was 23.8 percent by weight. The flexural strength of the finished laminate was 75,200 p.s.i.g.

A comparison of Examples 26 and 29 shows that a seven-ply laminate has substantially the same flexural strength as a twelve-ply laminate.

Example 30

A laminate was prepared the same as that in Example 26 except it was cured in a first stage for twenty-four hours at 100° C. using 19,000 p.s.i.g., followed by a second stage curing for twenty-four hours at 150° C. This laminate, in addition to the one from Example 28, was subject to a weathering test (ASTM D-1499) for 500 hours. A conventional phthalic anhydride cured glass fabric core diepoxy (Epon 828) laminate was also subjected to this test. The laminate, prepared using the compositions of this invention, showed no change in color or swelling. The diepoxy laminate darkened in color while the Example 28 laminate using the Selectron resin swelled appreciably.

Example 31

A liquid resin solution for use in preparing a tack-free prepreg was made by dissolving a sufficient amount of the maleic anhydride-hexene-1-copolymer described above in glycidyl methacrylate and acetone (30 percent by weight of the copolymer-glycidyl methacrylate) so that the anhydride to epoxide equivalent ratio was 1:1. The solution was applied by brush to the glass fabric 181 described above. The actone was removed after application of the solution to the glass fabric by air drying at room temperature. The prepreg was tack-free in about 5-10 minutes.

Subsequently, twelve of the prepregs were stacked together and heated at 80° C. for twenty-four hours at 20,000 p.s.i.g. and then for twenty-four hours at 150° C. at atmospheric pressure.

The finally cured laminate was found to have a resin content of 30 percent. The flexural strength of the laminate was 74,500 p.s.i.g.

Resort may be had to such variations and modifications as fall within the spirit of the invention and the scope of the appended claims.

I claim:

1. A new composition comprising a liquid solution at room temperature of a mixture of:
    a solid compound containing at least two succinic anhydride groups and less than three conjugated double bonds when one of the conjugated double bonds is between the carbon atoms alpha to the carbonyl groups in a succinic anhydride group; and
    a liquid alpha-olefinically unsaturated monooxirane compound containing as its only functional groups a single oxirane oxygen atom and said olefinic double bond and which contains substituents directly connected to the beta-carbon atom of the olefinic double bond, which substituents activate the alpha-olefin double bond for polymerization by free-radical means;
    said liquid solution capable of being cured to a solid infusible resin through reaction of the anhydride and epoxide groups and interaction of the olefinic double bonds of said monooxirane compound by free-radical means.

2. A composition according to claim 1 comprising, in addition, a soluble unconjugated tertiary amine.

3. A composition according to claim 2 wherein the tertiary amine is a monoamine wherein the nitrogen atom of the amine group is one of the ring atoms in an aromatic ring.

4. A composition according to claim 3 wherein the tertiary amine has the formula:

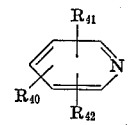

where $R_{40}$, $R_{41}$ and $R_{42}$ can be the same or different and are selected from the group consisting of hydrogen, a hydrocarbon radical having between 1 and 10 carbon atoms and a substituted hydrocarbon radical having between 1 and 10 carbon atoms.

5. A composition according to claim 1 wherein said solid compound is a solid polymer having at least two succinic anhydride groups produced by the copolymerization of:
    an unsaturated derivative of succinic anhydride, and
    an organic monoolefin having between 2 and 40 carbon atoms per molecule;
and said liquid monooxirane compound is an alpha-olefinically unsaturated terminal monoepoxide represented by the general formula:

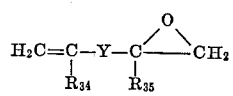

where $R_{35}$ is selected from the group consisting of hydrogen and a saturated hydrocarbon radical having between 1 and 10 carbon atoms; where $R_{34}$ is selected from the group consisting of hydrogen; halogen; —C≡N;

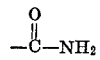

—COOR″ where R″ is any saturated hydrocarbon radical having between 1 and 10 carbon atoms; and

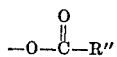

where R″ is as defined when Y is selected from the group consisting of

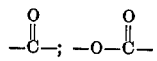

nothing and

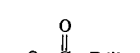

where R‴ is any divalent organic radical having between 1 and 20 carbon atoms; and where $R_{34}$ is selected from the group consisting of a saturated hydrocarbon radical having between 1 and 10 carbon atoms; hydrogen; halogen; —C≡N;

—COOR″ where R″ is as defined; and

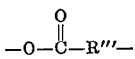

—where R‴ is as defined when Y is

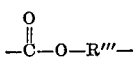

where R‴ is any divalent organic radical having between 1 and 20 carbon atoms.

6. A composition according to claim 5 wherein said solid polymer is produced by the copolymerization of:
an unsaturated dicarboxylic acid anhydride having the general formula:

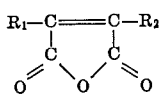

where $R_1$ is a member selected from the group consisting of hydrogen, halogen, a hydrocarbon radical, and a substituted hydrocarbon radical, and $R_2$ is selected from the group consisting of hydrogen and halogen atoms; and
an olefinic compound having the general formula:

where $R_3$ is selected from the group consisting of hydrogen, halogen, a hydrocarbon radical and a substituted hydrocarbon radical, and $x_1$ and $x_2$ are selected from the group consisting of hydrogen, halogen, a hydrocarbon radical, a substituted hydrocarbon radical, and —OR where R is a hydrocarbon radical.

7. A composition according to claim 6 wherein the solid polymer is produced by the copolymerization of maleic anhydride and an alpha olefin having between 2 and 30 carbon atoms, and the liquid monooxirane compound has the formula:

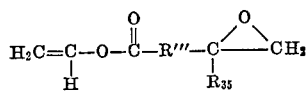

where $R_{35}$ is selected from the group consisting of hydrogen and a saturated hydrocarbon radical having between 1 and 10 carbon atoms, and R‴ is a divalent hydrocarbon radical having between 1 and 20 carbon atoms.

8. A composition according to claim 7 wherein the alpha olefin is hexene-1 and the monooxirane compound is glycidyl methacrylate.

9. A composition according to claim 8 comprising, in addition, between 0.01 and 20 parts by weight of a tertiary amine having the formula:

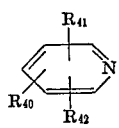

where $R_{40}$, $R_{41}$ and $R_{42}$ can be the same or different and are selected from the group consisting of hydrogen, a hydrocarbon radical having between 1 and 10 carbon atoms and a substituted hydrocarbon radical having between 1 and 10 carbon atoms.

10. A composition according to claim 9 wherein the tertiary amine is 3-picoline.

11. A composition according to claim 9 wherein the tertiary amine is 2,6-lutidine.

12. A composition according to claim 9 wherein the tertiary amine is acridine.

13. A composition according to claim 6 comprising, in addition, a mono-tertiary amine wherein the nitrogen atom of the amine group is one of the ring atoms in an aromatic ring.

14. The cured reaction product of a composition according to claim 1.

15. The cured reaction product of a composition according to claim 2.

16. The cured reaction product of a composition according to claim 6.

17. The cured reaction product of a composition according to claim 8.

18. The cured reaction product of a composition according to claim 2 wherein the monooxirane compound reacts initially substantially completely through the oxirane oxygen with the anhydride groups of said solid compound and then reacts through the olefinic double bond.

19. The cured reaction product of a composition according to claim 8 wherein the monooxirane compound reacts initially substantially completely through the oxirane oxygen with the anhydride groups of said solid compound and then reacts through the olefinic double bonds.

20. A method of curing a composition according to claim 1 which comprises heating said liquid composition at a temperature in excess of 80° C. for a time sufficient to result in the production of a resin having a Barcol 935 hardness in excess of 80.

21. A method of preparing a solid infusible resin having a high heat distortion temperature which comprises:
forming a liquid solution of a solid compound containing at least two succinic anhydride groups and less than three conjugated double bonds when one of the conjugated double bonds is between the carbon atoms alpha to the carbonyl groups in a succinic anhydride group, and a liquid alpha-olefinically unsaturated monooxirane compound containing at its only functional groups a single oxirane oxygen atom and said olefinic double bond and which contains substituents directly connected to the beta-carbon atom of the olefinic double bond which substituents activate the alpha-olefin double bond for polymerization by free-radical means;
crosslinking said solid compound and said monooxirane compound substantially only by reacting the oxirane atom with the anhydride groups; and
thereafter polymerizing said monooxirane compound through the double bond at a temperature of at least 80° C.

22. A method according to claim 16 wherein said liquid solution contains, in addition, a soluble unconjugated tertiary amine.

23. A method of preparing a solid infusible resin having a high heat distortion temperature which comprises:
forming a liquid solution of a solid compound containing at least two succinic anhydride groups and less than three conjugated double bonds when one of the conjugated double bonds is between the carbon atoms alpha to the carbonyl groups in a succinic anhydride group, and a liquid alpha-olefinically unsaturated monooxirane compound containing as its only functional group a single oxirane oxygen atom and said olefinic double bond and which contains substituents directly connected to the beta-carbon atom of the olefinic double bond, which substituents activate the alpha-olefin double bond for polymerization by free-radical means;
adding to said liquid between 0.01 and 20 weight percent based on said solution of a soluble unconjugated tertiary amine;
partially curing said liquid solution in a first stage at a temperature less than 80° C. for a time sufficient to obtain a solid resin; and
thereafter finally curing the resin in a second stage at a temperature in excess of 80° C.

24. A method according to claim 23 wherein the second stage curing temperature is between 90° and 200° C.

25. An article of manufacture which comprises a sheet of fibrous material having a tack-free coating thereon comprising an intimate admixture of a compound containing at least two succinic anhydride groups and less than three conjugated double bonds when one of the conjugated double bonds is between the carbon atoms alpha to the carbonyl groups in a succinic anhydride group; and an alpha-olefinically unsaturated monooxirane compound containing as its only functional groups a single oxirane oxygen atom and said olefinic double bond and which contains substituents directly connected to the beta-carbon atom of the olefinic double bond, which substituents activate the alpha-olefin double bond for polymerization by free-radical means, wherein said admixture, the anhydride to epoxide ratio is at least 1:1.

26. An article of manufacture according to claim 25 wherein the fibrous material is a sheet of glass fabric.

27. An article of manufacture according to claim 26 wherein the solid compound is a copolymer of maleic anhydride and hexene-1 which has at least two anhydride groups and wherein the olefinically unsaturated monooxirane compound is glycidyl methacrylate.

28. An article of manufacture which comprises layers of a porous inert material impregnated and held together by the reaction product of a mixture comprising a solid compound containing at least two succinic anhydride groups and less than three conjugated double bonds when one of the conjugated double bonds is between the carbon atoms alpha to the carbonyl groups in a succinic anhydride group; and a liquid alpha-olefinically unsaturated monooxirane compound containing as its only functional groups a single oxirane oxygen atom and said olefinic double bond and which contains substituents directly connected to the beta-carbon atom of the olefinic double bond, which substituents activate the alpha-olefin double bond for polymerization by free-radical means; said solid compound being substanitially completely dissolved in said liquid monooxirane compound to form a liquid solution at room temperature before said impregnation.

29. An article of manufacture according to claim 28 wherein the porous inert material is glass fabric, the solid compound is the copolymer of maleic anhydride and hexene-1 which has at least two anhydride groups, and wherein the olefinically unsaturated monooxirane compound is glycidyl methacrylate.

30. A composition according to claim 1 wherein the substituents in said monooxirane compound are selected from the group consisting of halogen;

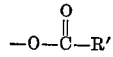

where R' is any organic radical;

where R' is any organic radical; —C≡N; an aromatic radical;

and

where R' is any organic radical.

31. A composition according to claim 1 wherein said solid compound is a solid polymer having at least two succinic anhydride groups produced by the copolymerization of:

an unsaturated derivative of succinic anhydride, and
an organic monoolefin having between two and 40 carbon atoms per molecule;
and said liquid monooxirane compound is an alpha-olefinically unsaturated terminal monoepoxide represented by the general formula:

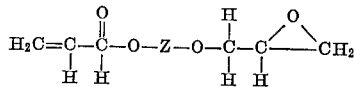

where Z is any hydrocarbon radical having from one to 20 carbon atoms.

References Cited

UNITED STATES PATENTS 3,374,209  3/1968  Hay et al. _____ 260—78.4

JOSEPH L. SCHOFER, *Primary Examiner.*

J. KIGHT III, *Assistant Examiner.*

U.S. Cl. X.R.

161—249, 250; 260—78.4

PO-1050
(5/69)

UNITED STATES PATENT OFFICE
CERTIFICATE OF CORRECTION

Patent No. 3,453,246    Dated  July 1, 1969

Inventor(s)  William J. Heilman

It is certified that error appears in the above-identified patent and that said Letters Patent are hereby corrected as shown below:

Column 6, line 60, "2-heptadecyl-2-eicosene" should read -- 3-heptadecyl-2-eicosene". Column 10, line 34, "  " should read --  -- . Column 11, line 10, "-O-C''-R'''- " should read --  --; and line 20, "-C''-O-R'''- " should read -- 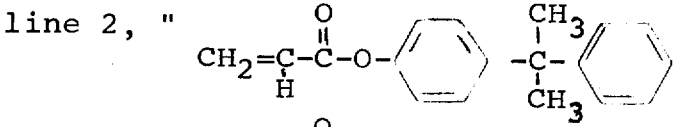 --. Column 12, line 2, " 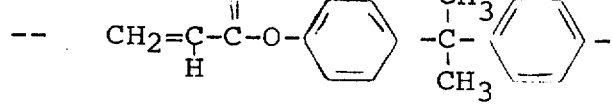 " should read -- 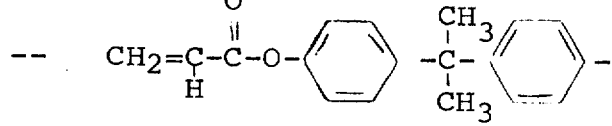 -- . Column 16, line 59, "triodecylamine" should read --tridodecylamine--. Column 18, line 50-51, "accelerator" should read --accelerators--. Column 23, line 23, "liminate" should read --laminate--; and line 66, "having" should read --have--. Claim 21, column 28, line 38, "at" should read --as--; and line 46, after "oxirane" insert --oxygen--. Claim 23, column 28, line 68, after "liquid" insert --solution--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents